United States Patent [19]

di Monteforte

[11] Patent Number: 4,555,865
[45] Date of Patent: Dec. 3, 1985

[54] RIGID THERMOINSULATING MOVABLE COVERING FOR GREENHOUSES AND THE LIKE

[76] Inventor: Francesco V. di Monteforte, 184 Via Vittorio Emanuele, 95029 Viagrande (Catania), Italy

[21] Appl. No.: 396,135

[22] Filed: Jul. 7, 1982

[30] Foreign Application Priority Data

Jul. 7, 1981 [IT] Italy ............... 35902/81[U]

[51] Int. Cl.⁴ .......................... A01G 9/24; A01G 9/22
[52] U.S. Cl. ......................................... 47/17; 52/64; 52/67
[58] Field of Search ............. 52/22, 64, 67, 86, 404, 52/407, 2, 66; 47/17

[56] References Cited

U.S. PATENT DOCUMENTS

| | | | |
|---|---|---|---|
| 2,019,831 | 11/1935 | Ricardo | 52/64 |
| 3,324,593 | 6/1967 | Strasser | 47/17 X |
| 3,350,823 | 11/1967 | Murray | 52/200 |
| 3,741,631 | 6/1973 | Laing | 47/17 X |
| 4,244,146 | 1/1981 | Kranz | 47/17 |
| 4,290,242 | 9/1981 | Gregory, Jr. | 47/17 X |
| 4,297,813 | 11/1981 | Farrell | 52/2 |
| 4,352,259 | 10/1982 | Smith et al. | 47/17 X |

FOREIGN PATENT DOCUMENTS

| | | | |
|---|---|---|---|
| 2413507 | 8/1979 | France | 52/67 |
| 2018324 | 10/1979 | United Kingdom | 52/67 |

Primary Examiner—John E. Murtagh

[57] ABSTRACT

Rigid, thermoinsulating, movable covering for greenhouses or the like, comprising a self-supporting structure provided with a coating of thermoinsulating material or consisting of such material, adapted to move on tight sliding means in the interior or exterior of said greenhouses or the like from an inoperative position to an operative position and vice versa. Said self-supporting structure can be an enbloc structure or a telescopic structure, and said sliding means can consist of floats immersed in water.

9 Claims, 3 Drawing Figures

RIGID THERMOINSULATING MOVABLE COVERING FOR GREENHOUSES AND THE LIKE

This invention relates to a rigid, movable covering suitable for the thermal insulation of greenhouses and the like.

For the conservation of the appropriate environmental conditions in traditional greenhouses, the geothermal heat is, when necessary, integrated with heat produced by proper heating equipments which involve a notable burden for the operating costs because of the high price of the fuel, this burden being the more relevant considering that a not at all negligible percentage of the geothermal as well as of the artificial heat is lost through the greenhouse walls, particularly during the night hours when the internal-external temperature differential is higher. On the other hand the resort to a fixed thermal wall insulation of the mentioned premises, although saving the heat dispersion, would avoid a convenient irradiation of the cultivation during the day hours, negatively affecting their growth.

Object of this invention is to provide a rigid thermoinsulating covering to be installed on the exterior or the interior of the greenhouses or the like, adapted to be moved from an inoperative position to an operative position (in order to prevent the dispersion, from the interior to the exterior, of the heat from the soil itself as well as that produced artificially when the environmental conditions require it), and viceversa.

The rigid thermoinsulating movable covering of this invention can consist of a single monobloc body or of several sections which can be telescopically inserted each in the other in order to limit the occupied area in the inoperative position or, for particular types of greenhouses, it can be limited to the ceiling zone alone providing a fixed thermic wall insulation.

Although the assembly of the covering of this invention can be, as mentioned above, provided externally as well as internally to the application premises, the internal installation is preferable to the external one, because it implies a simpler and less expensive structure, since it has to support reduced loads, limited to the dead load and to that of the insulating materials, generally distinguished by a remarkable lightness, without having to provide particular protection for an adequate resistance to atmospheric agents. Even in the possible case of a mixed installation with the operative and the inoperative position respectively at the interior and at the exterior of the greenhouse, the covering structure could still be of the above mentioned simplified type, resorting, if necessary, to its shelter in the internal service position in case of particular inclement atmospheric conditions which could jeopardize its integrity.

The thermal insulation of the covering referred to can be realized with any adequate insulating material available on the market, such as polystyrene foam.

The movement of the covering of this invention can be carried out by hand when its dimensions and weight allow it or by conventional mechanical pulling means, conveniently providing however suitable stroke limit devices.

The mechanical movement can also take place automatically by the installation of proper control equipments provided with thermostatic photocell devices or the like.

It has here to be pointed out that for certain cultivations that require a "short day", that is when the hours of darkness have to be more than those of light, the covering of this invention lends itself advantageously to creating the ideal environmental conditions with regard to the creation of the required obscurity as well as to the conservation of the most adequate temperature conditions that are not obtainable with the traditional darkening systems such as draperies or the like.

An inconvenience that could be debited to the rigid thermoinsulating movable covering at issue is that relative to the space occupied in the inoperative position, inconvenience for which on the other hand it is easy to find a remedy undertaking the cultivation of that area with cultures that ask for particular lack of light conditions like mushrooms or subtropical plants, these conditions being maintained, during the translation of the covering in the operative position, by conventional drapery darkening systems or the like.

Where it is considered convenient, the exterior and the interior surfaces of the covering referred to can be coated with aluminum sheets fit to avoid an excessive heating by reflecting the solar radiations and to keep the heat in the interior of the covering itself, respectively.

This invention will be better illustrated later on in the description of preferred embodiments referring to the enclosed drawings, given by way of non restrictive examples.

Figure 1:
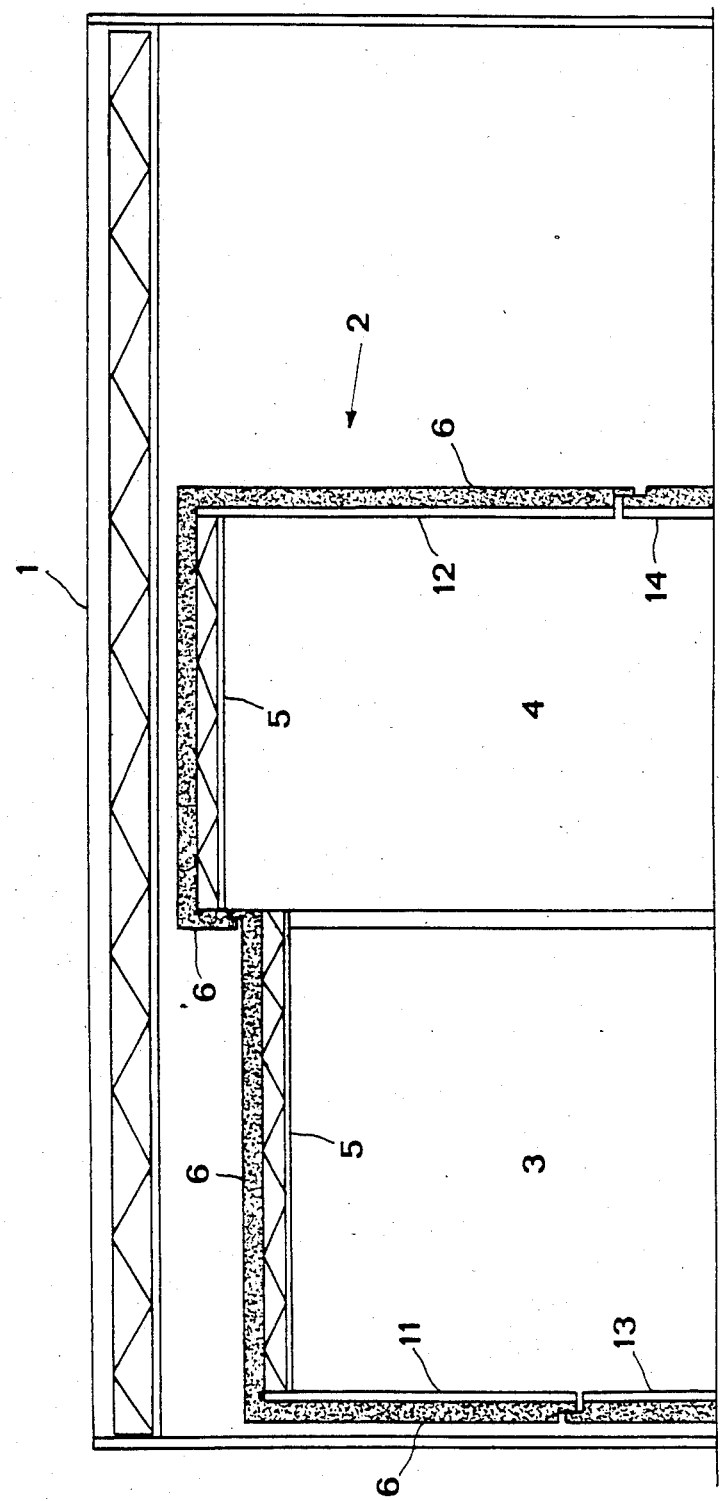
FIG. 1 is a schematic longitudinal section view of a rigid telescoping thermoinsulating movable covering according to the invention, installed in a conventional greenhouse.
Figure 2:
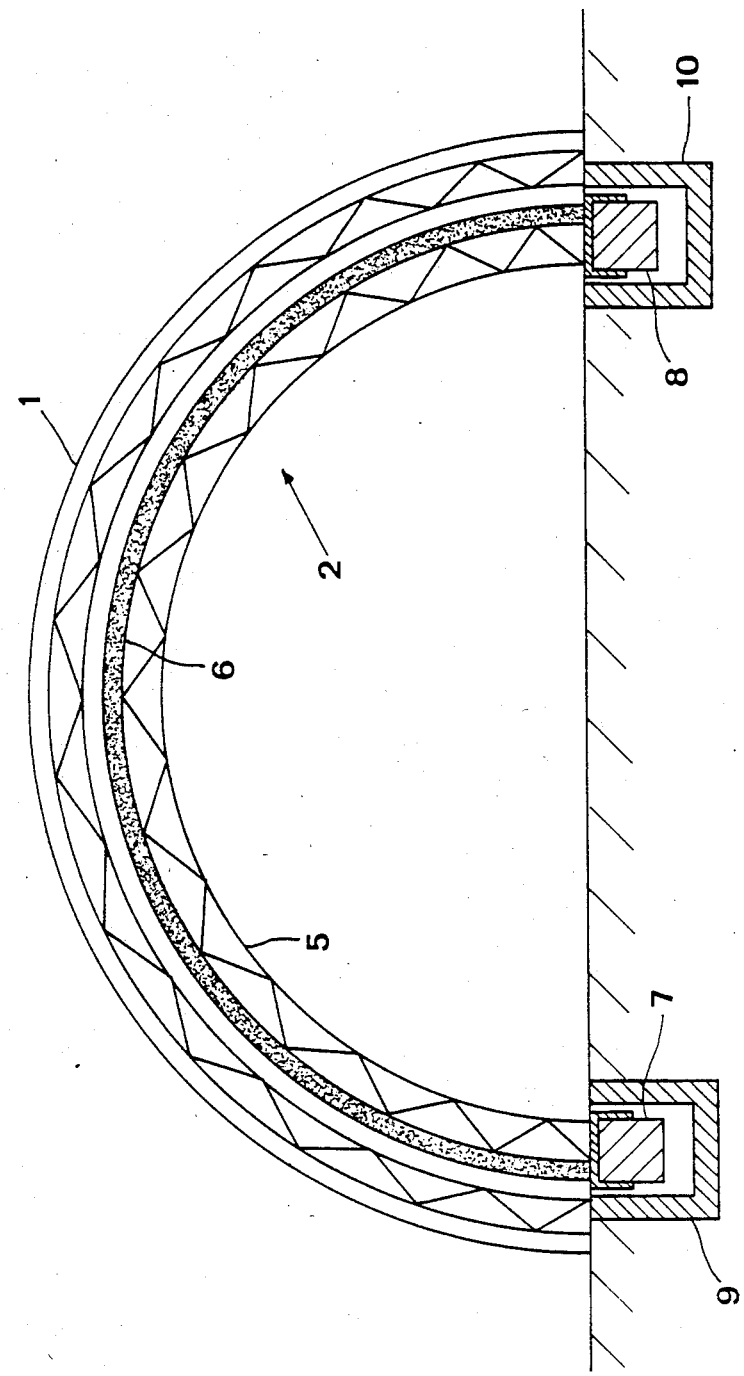
FIG. 2 is a schematic cross-section view of the covering of FIG. 1.

Referring to FIGS. 1 and 2, a conventional greenhouse having, in the present example, a semi-circular vaulted configuration, is indicated with 1.

As mentioned before, a serious inconvenience implied by this kind of premises is that of a remarkable heat dispersion, both geothermal as well as artificial heat, from the interior to the exterior through the walls, even if with the evolution of the most sophisticated modern technology it was attempted to remedy this energy waste by the adoption of special coatings with materials which present a particularly reduced thermal conductivity although provided with an excellent transparency.

According to the invention, in order to avoid the above mentioned undesired heat dispersion, especially during the night hours when the flow of solar thermal energy is missing and the difference between internal and external temperature is higher, a rigid thermoinsulating covering, indicated generally with 2, adapted to move from an inoperative to an operative position and viceversa, is installed, preferably in the interior of green-house 1 as shown in the present example.

In the present example of embodiment, the rigid thermoinsulating covering 2, which has the same configuration of the greenhouse 1, is formed of two portions 3 and 4 which can be telescopically inserted one into the other in order to allow a reduced space to be occupied in the inoperative position.

The covering 2 consists of a supporting structure 5, that does not have any particular resistance requirements in consideration of its working conditions, provided on the exterior surface with a coating of thermoinsulating material 6, such as polystyrene foam.

In order to ensure the sliding of the covering 2 and at the same time the tightness at the floor level, this embodiment presents an original solution (see FIG. 2) in which each springer surface of the covering 2 is connected to a respective float 7, 8 submerged in water cointained in channels 9 and 10, which extend for the entire length of the greenhouse 1, allowing in this way easily the movement of the covering 2 by a simple action of manual pushing from the inoperative to the working position and viceversa, without an interruption of the thermal insulation.

Obviously other systems can be adopted for the movement, for instance providing the covering 2 with wheels running on rails or tracks and carrying out the tightness by immersing, for instance, said springer surfaces of the supporting structure in water-filled channels or with labyrinth connections between movable and fixed parts.

In order to close the heads of the covering 2, plain end walls 11 on portion 3, and 12 on portion 4, respectively, are provided, also coated with thermoinsulating material 6 similar to that used for the vault.

In order to obtain the tightness of said heads, allowing at the same time their sliding, the walls 11 and 12 extend only partially towards the ground (see FIG. 1) and end in the lower part with an offset engageable, in the operative position, with a complementary offset present on the upper end of fixed wall portions 13 and 14 respectively arranged for the tightness on the ground of the greenhouse 1.

As shown in FIG. 1, the wall 11 has a lesser extension than that of wall 12 in order to allow the first to avoid the fixed wall portion 14, obviously shorter than the portion 13 when moving to the inoperative position of the covering 2, that is moving to the right in FIG. 1.

As mentioned above, the covering of this invention can be of the enbloc type, instead of being composed of several telescopic sections, with the advantage of simplifying its structure as much as possible and therefore with a sensible cost reduction, but with the disadvantage of a larger volume of space occupied in the inoperative position.

Figure 3:
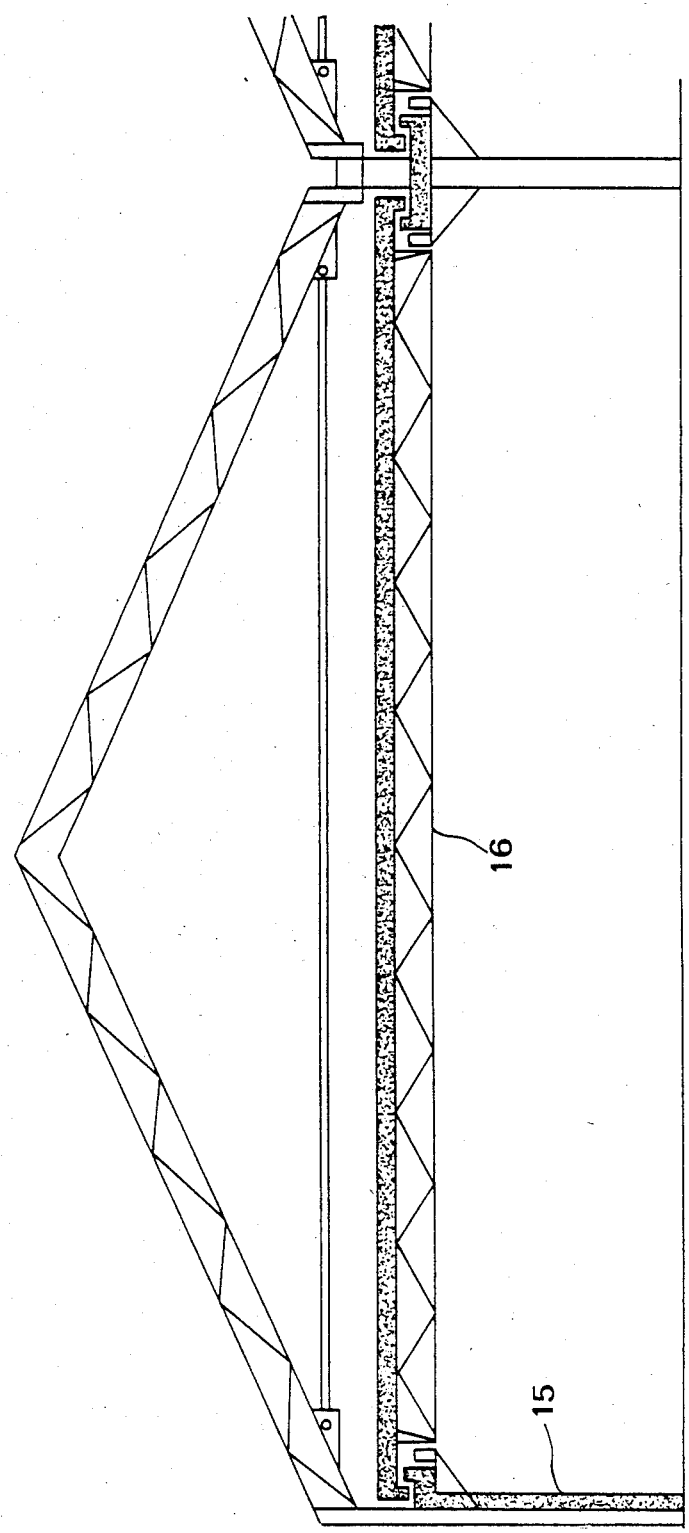
FIG. 3 is a schematic cross-section view of a rigid thermoinsulating movable roof covering according to the invention, installed in greenhouses of large dimensions.

Referring to FIG. 3, a variation of the rigid thermoinsulating movable covering of the invention is shown with regard to its application to continuous span greenhouses of large dimensions.

As the area of the side walls of these greenhouses can be considered relatively negligible in respect to the total area, said walls can be insulated with preferably interior fixed coatings 15 of thermoinsulating material, restricting the movable insulation only to the ceiling by installing thermoinsulating sliding panels 16, preferably superimposable in the inoperative condition in order to reduce the space then occupied, and paying attention to provide a connection of the movable and fixed parts so as to ensure the sliding of them guaranteeing the tightness of the whole, for example by labyrinth connections.

The panels 16 can be plain, as shown in FIG. 3, or weathered in order to allow an easier draining of the condensate.

This invention is not limited to the described examples of embodiment but comprises any execution variation of them.

I claim:

1. A movable rigid thermoinsulating covering for preventing the dispersion of heat from the interior to the exterior of a greenhouse associated with parallel channels along the length of the greenhouse comprising a monobloc rigid self-supporting structure provided with a single layer of polystyrene foam thermoinsulating material, the structure including a ceiling zone and a plurality of springer surfaces, the structure also being provided with a sliding means including a plurality of floats integral with the springer surfaces, the floats being immersed in water contained in the parallel channels, the channels being positioned, configured and dimensioned along the length of the greenhouse so that the structure can be moved from an inoperative to an operative position, wherein the inoperative position provides an area of the greenhouse suitable for the cultivation of plants that require minimal light conditions for growth.

2. A movable rigid thermoinsulating covering as in claim 1 wherein the layer of polystyrene foam is provided with a reflective means on its outer surface.

3. A movable rigid thermoinsulating covering as in claim 1 wherein the layer of polystyrene foam is provided with a reflective means on its inner surface.

4. A movable rigid thermoinsulating covering as in claim 1 wherein the layer of polystyrene foam is provided with a reflective means on both its inner and outer surfaces.

5. A movable rigid thermoinsulating covering as in claim 4 wherein the reflective means is aluminum sheet material.

6. A rigid thermoinsulating covering as in claim 1 wherein the parallel channel and the rigid self-supporting structure are located on the exterior of the greenhouse.

7. A rigid thermoinsulating covering as in claim 1 wherein the parallel channels and the rigid self-supporting structure are located on the interior of the greenhouse.

8. A rigid thermoinsulating covering as in claim 1 wherein the rigid self-supporting structure has the same configuration as the greenhouse.

9. A rigid thermoinsulating covering as in claim 1 wherein the structure is moved from the operative to the inoperative position by means of mechanical movement.

* * * * *

UNITED STATES PATENT AND TRADEMARK OFFICE
CERTIFICATE OF CORRECTION

PATENT NO. : 4,555,865

DATED : December 3, 1985

INVENTOR(S) : Francesco Ventimiglia di Monteforte (As Corrected)

It is certified that error appears in the above-identified patent and that said Letters Patent are hereby corrected as shown below:

Title page, inventors name "di Monteforte" appearing in bold face type, should read --Ventimiglia di Monteforte--

Title page, at I.N.I.D. [76] inventor "Francesco V. di Monteforte" should read --Francesco Ventimiglia di Monteforte--

Signed and Sealed this

Twenty-ninth Day of April 1986

[SEAL]

Attest:

DONALD J. QUIGG

Attesting Officer

Commissioner of Patents and Trademarks